United States Patent [19]
Hickman

[11] 3,749,417
[45] July 31, 1973

[54] TANDEM WHEEL VEHICLE SPRING SUSPENSION

[76] Inventor: Albert F. Hickman, 8009 N. State Rd., Eden, N.Y. 14057

[22] Filed: Sept. 21, 1971

[21] Appl. No.: 182,362

[52] U.S. Cl.............. 280/104.5 R, 280/81 TR
[51] Int. Cl.............................................. B60g 25/00
[58] Field of Search.............. 280/104.5 R, 104.5 A, 280/104.5 B, 81 R

[56] References Cited
UNITED STATES PATENTS

| | | | |
|---|---|---|---|
| 3,410,573 | 11/1968 | Hickman...................... | 280/104.5 R |
| 2,493,024 | 1/1950 | Pointer......................... | 280/104.5 R |
| 3,512,799 | 4/1967 | Hickman...................... | 280/104.5 R |

Primary Examiner—Philip Goodman
Assistant Examiner—John A. Carroll
Attorney—Harold I. Popp

[57] ABSTRACT

As in my U.S. Pat. No. 3,410,573 each of two or more tandem wheels are connected to one side of the vehicle frame by a hub structure journalled on the frame and having a fixed, radially projecting arm to the opposite end of which the corresponding tandem wheel is journalled. Compensating levers are severally fixed to project radially from these hub structures generally toward each other with their ends arranged above one another. The present improvement resides in the movement of these ends toward one another in response to increasing load, so that a simple spring therebetween provides substantially the entire resilient support for the frame on the wheels. Also the other end of the compensating lever for the front tandem wheel is arranged below the companion end of the compensating lever for the rear tandem wheel, so that in the event of spring failure such other ends of the compensating levers merely come together and there is no tendency for one to dig into the highway. By the addition of a short double-ended compensating lever and an additional hub structure, stub axle and wheel arm, the invention can be embodied in a self steering triple tandem wheel suspension using most of the parts of the two tandem wheel suspension.

3 Claims, 9 Drawing Figures

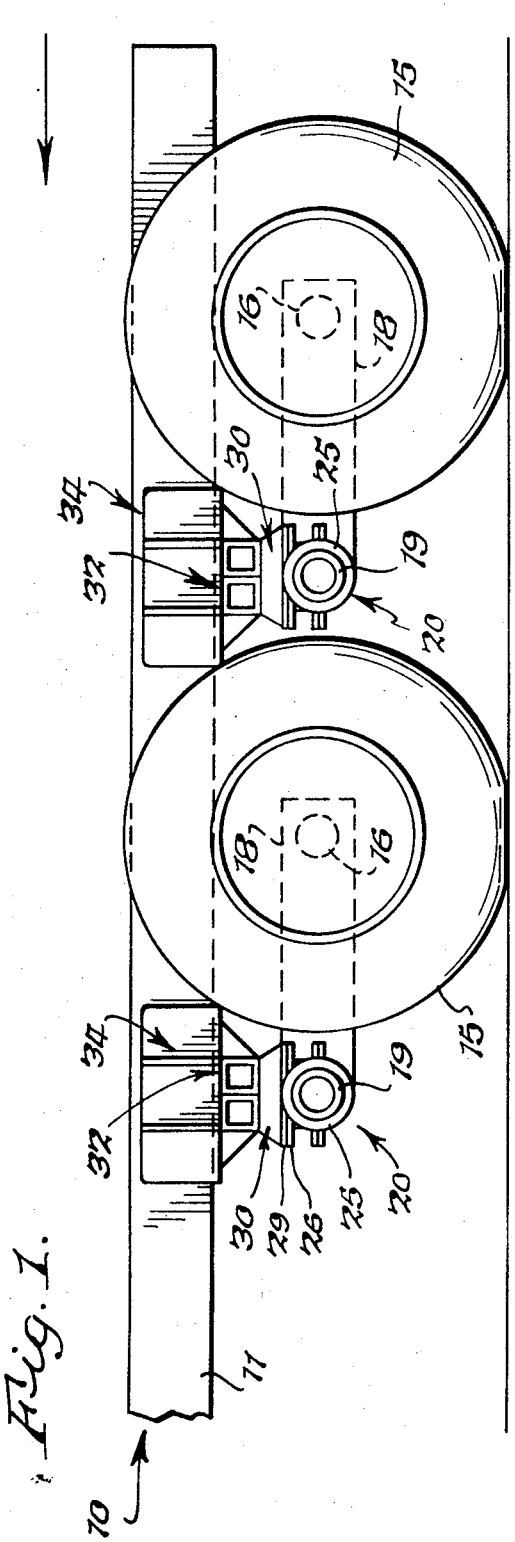
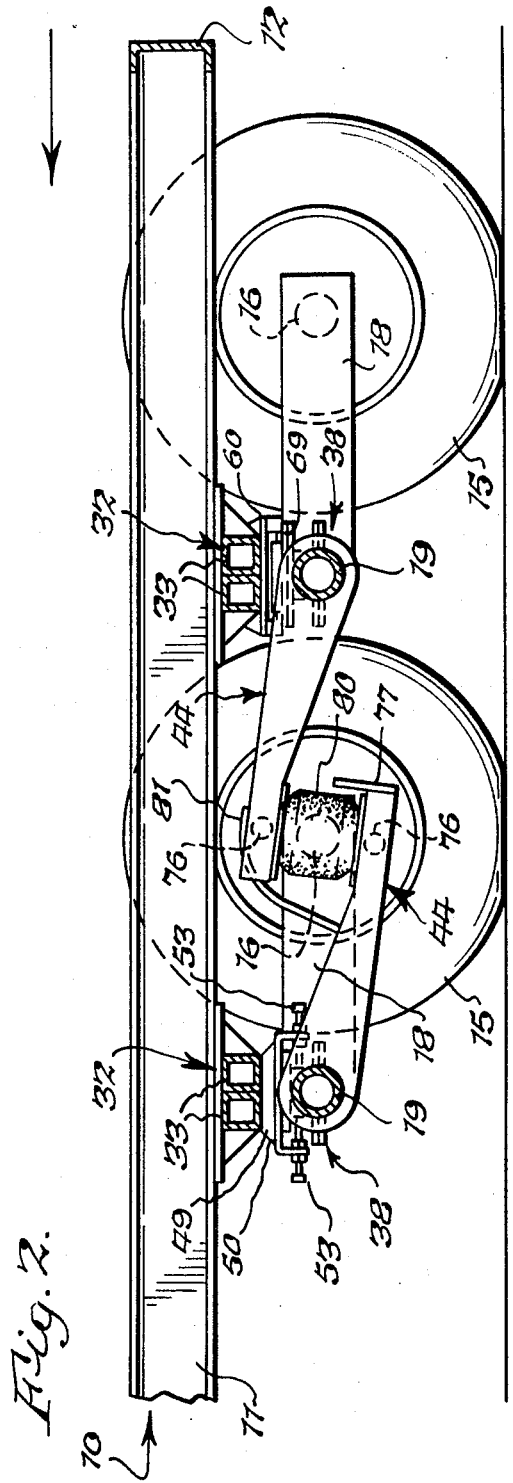

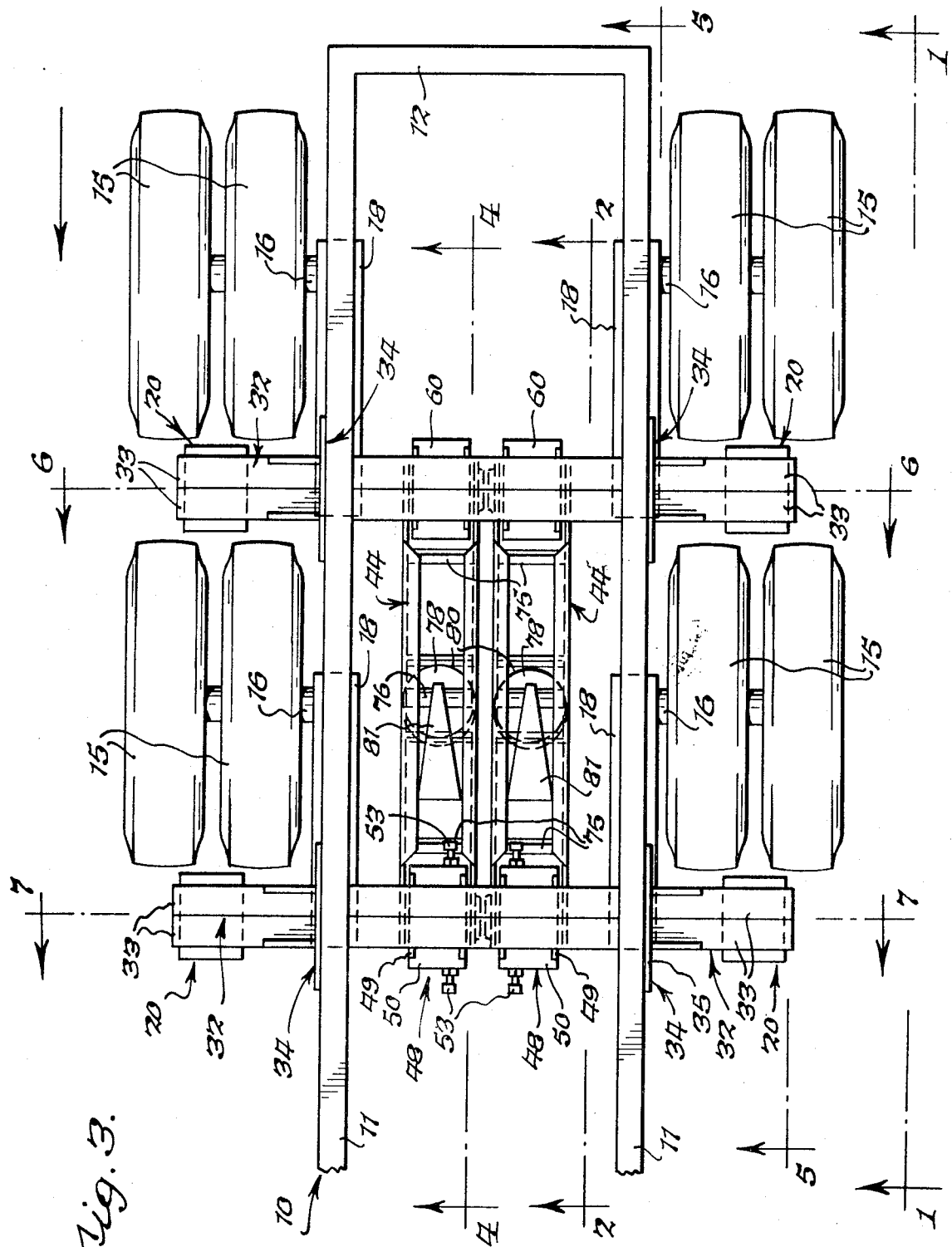

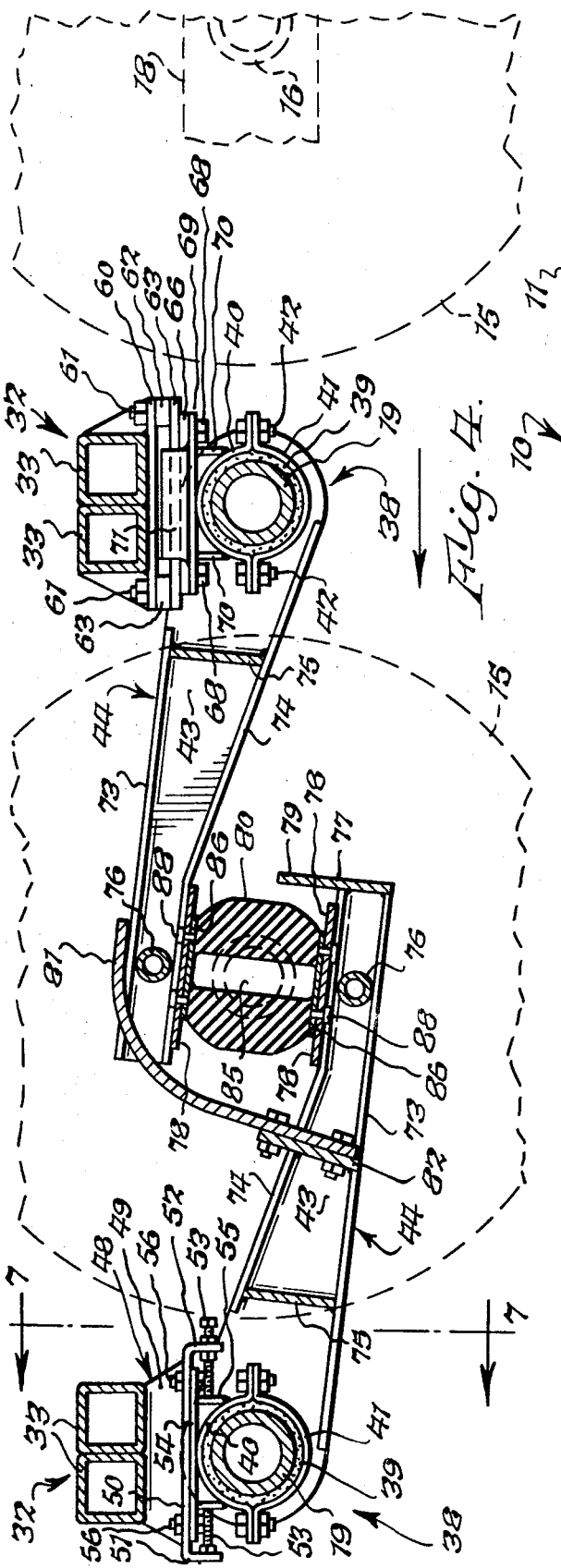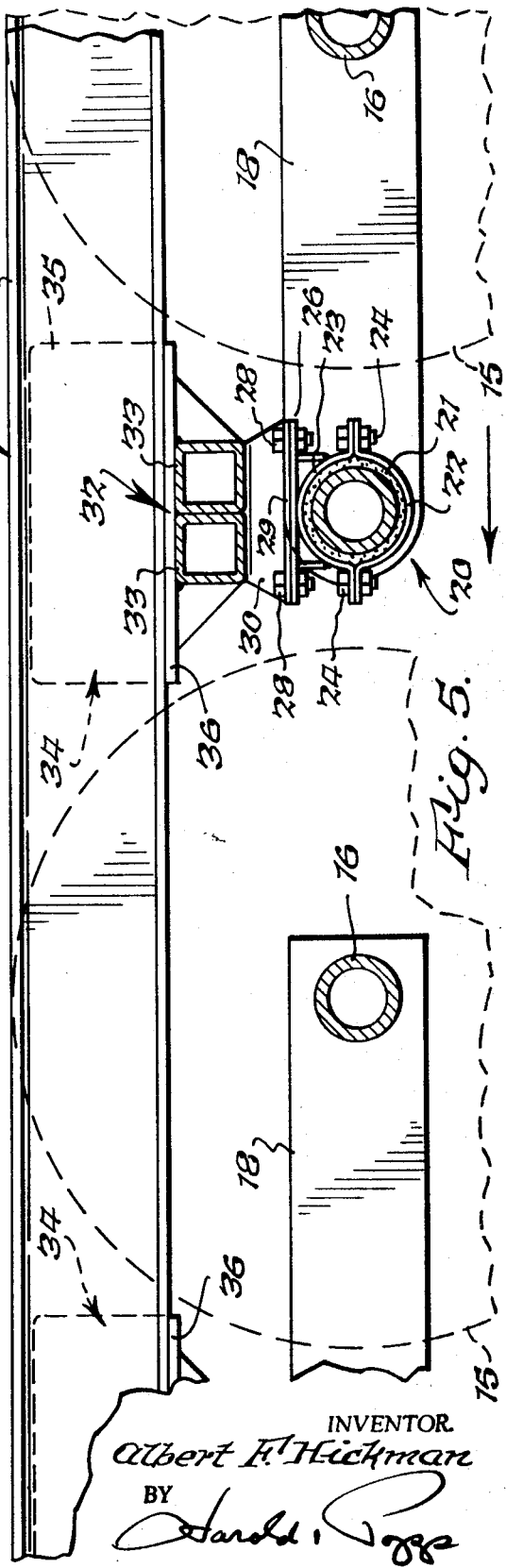

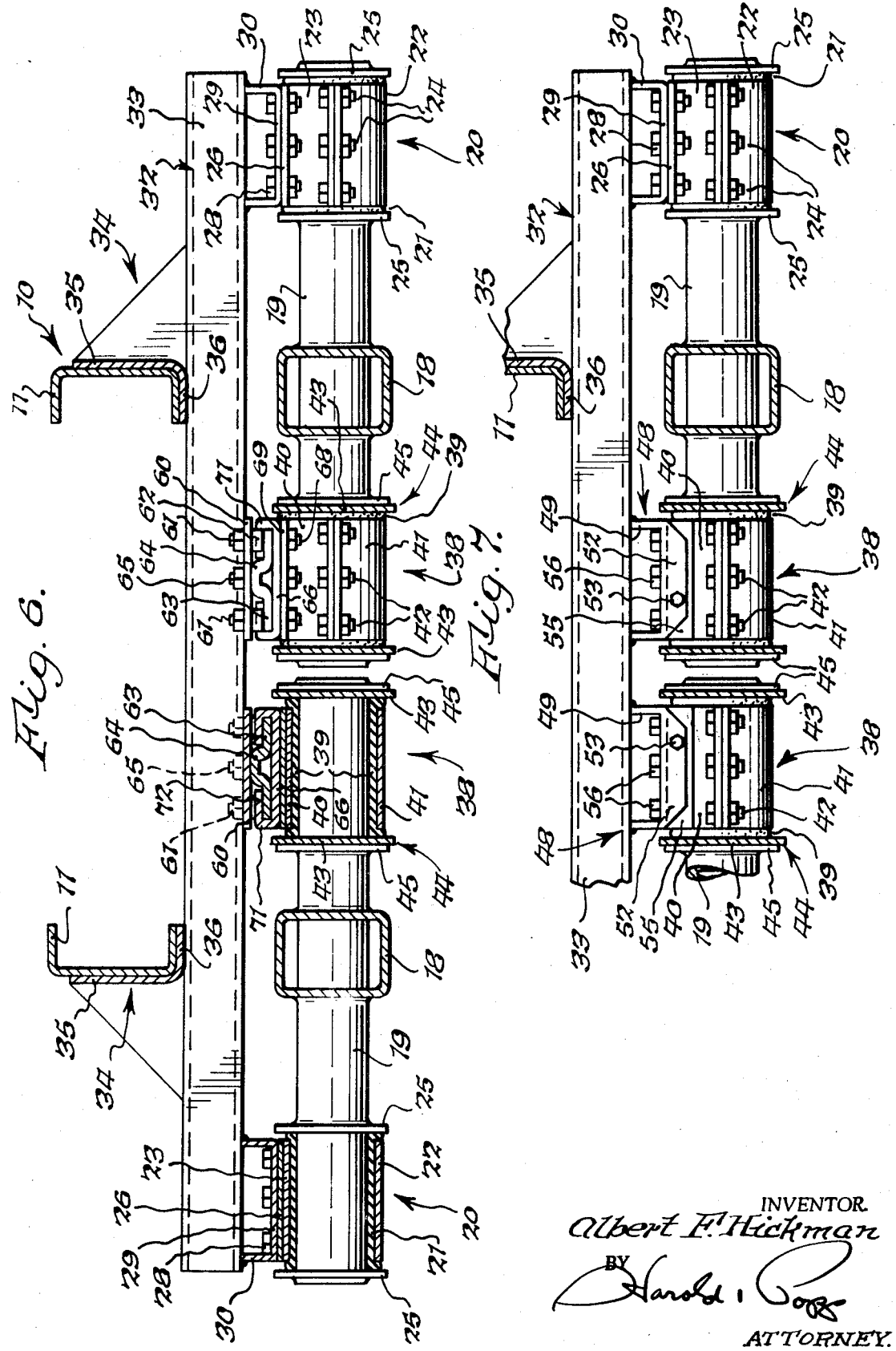

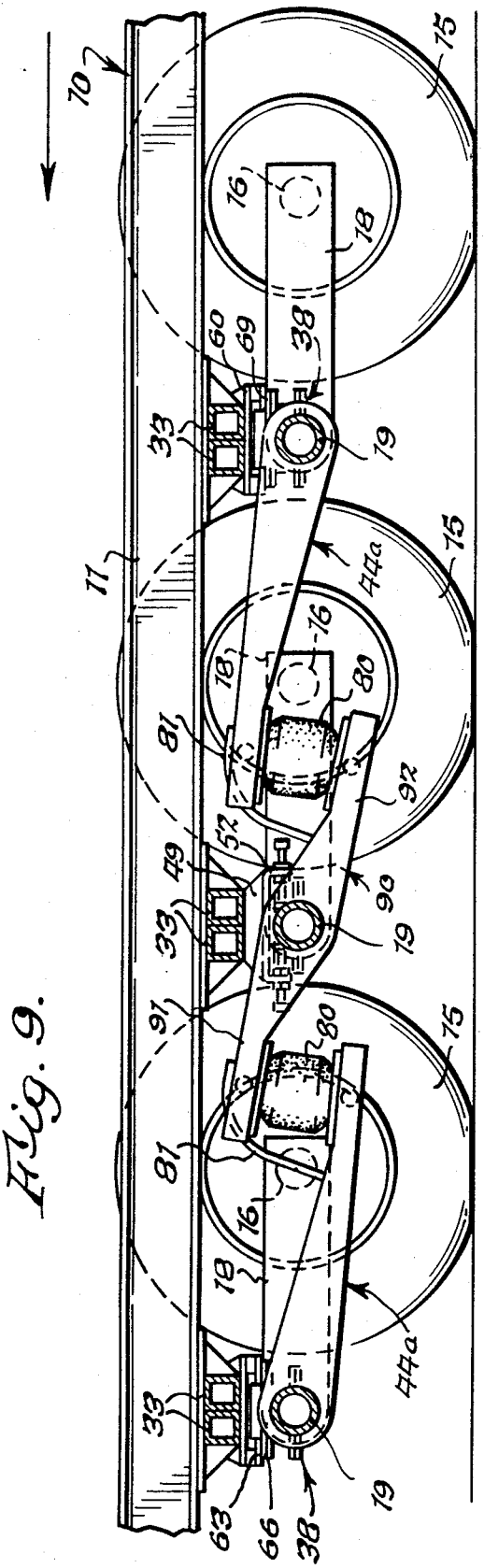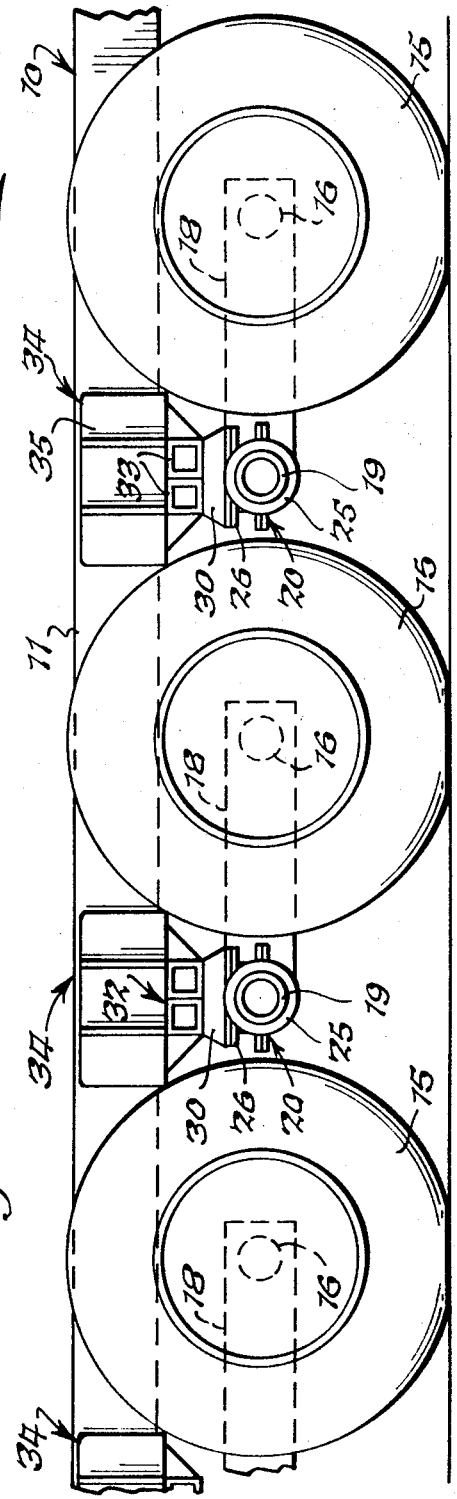

TANDEM WHEEL VEHICLE SPRING SUSPENSION

One of the principal objects of the invention is to provide a tandem wheel suspension including compensating levers journalled to the frame at one end, their opposite superposed ends being arranged to move vertically toward each other in response to increasing loads, so that a simple spring means can be interposed between such superposed ends to provide substantially the entire resilient support for the frame on the wheels.

Another object is to provide such a suspension in which such spring means can be in the form of a simple compression rubber body which expands and contracts laterally of the line of force applied thereto to provide such support.

Another object is to provide such a suspension in which the rear end of the compensating lever for the front tandem wheel is biased upwardly by the body load and projects under the front end of the rear wheel compensating arm, thereby to prevent either compensating arm from digging into the highway in the event of spring failure, which digging in could cause a disasterous wreck.

Another object is to provide such a suspension capable of being in a self-steering three tandem wheel suspension using, for the most part, the same parts as the two wheel tandem, thereby to reduce costs as well as to reduce inventory requirements in the field.

Other objects and advantages will appear from the following description and drawings in which:

FIG. 1 is a fragmentary side elevational view of the rear end of an unloaded vehicle frame supported at each side by a two tandem wheel suspension embodying the present invention, parts being omitted for clarity, this view being taken on line 1 — 1, FIG. 3. In this and other views the direction of vehicle travel is indicated by a large arrow.

FIG. 2 is a fragmentary longitudinal section thereof taken generally on line 2 — 2, FIG. 3.

FIG. 3 is a fragmentary top plan view of the rear end of the frame and the two tandem wheel suspension shown in FIGS. 1 and 2.

FIGS. 4 and 5 are enlarged fragmentary vertical longitudinal sectional views taken on the correspondingly numbered lines, FIG. 3.

FIG. 6 is an enlarged vertical transverse section taken generally on line 6 — 6, FIG. 3.

FIG. 7 is a fragmentary transverse section taken generally on line 7 — 7, FIGS. 3 and 4, parts being shown in elevation.

FIG. 8 is a side elevational view similar to FIG. 1 and illustrating a modified form of the invention in which the frame is supported by three self-steering wheels at each side thereof.

FIG. 9 is a view similar to FIG. 2 of the form of the invention shown in FIG. 8.

THE VEHICLE FRAME, ALL FIGURES.

The main frame 10 of the vehicle can be of any suitable construction and is shown as comprising a pair of main longitudinal side frame bars 11 in the form of inwardly facing straight and parallel channels connected at their rear ends by an inwardly facing cross channel bar 13.

TWO TANDEM SUSPENSION - FIGS. 1 – 7.

Both forms of the invention are shown as supported by wheels 15, these wheels being shown in the form of dual tired wheels, that is, pairs of rim structures bolted together side-by-side and each pair of rim structures being journalled on a stub axle 16 in any suitable manner (not shown), these stub axles extending horizontally and transversely of the line of vehicle travel and the stub axles 16 at opposite sides of the vehicle being normally arranged, in pairs, axially in line with each other as best shown in FIG. 3. Each stub axle is welded or otherwise fixed to the outboard end of an arm 18, this being the rear end of the arm with reference to the line of vehicle travel. Each such arm 18 can be of any suitable form but is shown as being of rectangular tubular form in cross section with its stub axle 16 extending therethrough and being welded thereto. The inboard or forward end of each arm 18, with reference to the line of vehicle travel, is welded to a horizontal hub structure in the form of a cross shaft 19. Each cross shaft is shown in the form of a round tubular cross shaft extending transversely of the line of vehicle travel and as being arranged parallel with its stub axle 16 and the axis of its wheel.

The outer end of each tubular cross shaft 19 is journalled in a bearing 20 which is preferably in the form of a rubber bushed bearing. As best shown in FIGS. 5 and 6, each of these bearings comprises a rubber bushing 21 surrounding and held in compressive relation with the outer end of its tubular cross shaft 19 by metal half bearing housings 22 and 23, these half bearing housings being drawn together to compress the rubber bushing 21 by bolts 24. The ends of the rubber bushings 21 project beyond the half bearing housings 22, 23 and abut against abutment rings 25 welded to the companion cross shaft 19 as best shown in FIGS. 6 and 7. Each top half bearing housing 22 is provided with a horizontal top plate 26 welded thereto and which is bolted, as by bolts 28, to the bottom plate 29 of a U-shaped spacer block 30. The upstanding legs of each spacer block 30 are welded to the underside of a tubular cross bolster 32 formed by a pair of identical tubes 33 of rectangular form in cross section arranged side-by-side and welded to each other. Each bolster 32 extends under both main longitudinal side frame bars 11 of the vehicle frame 10 and is secured at each end to the corresponding main longitudinal side frame bar 11 by a frame bracket 34. Each frame bracket 34 comprises a vertical plate 35 secured in any suitable manner to the outside of each main longitudinal side frame bar 11 and having a horizontal flange 36 underlying this main longitudinal side frame bar 11 and overlaying the cross bolster 32, as best shown in FIGS. 5 – 7.

The inner end of each hub structure or tubular cross shaft 19 is connected to the corresponding cross bolster 32 by a bearing 38 which is also preferably a rubber bushed bearing. As best shown in FIGS. 4, 6 and 7, each bearing 38 comprises a rubber bushing 39 surrounding and held in compressive relation with the inner end of the corresponding tubular cross shaft 19 by a pair of metal half bearing housings 40, 41, these half bearing housings being drawn into compressive relation with the rubber bushings 39 by bolts 42. The opposite ends of each rubber bushing 39 protrudes beyond its half bearing housings and abuts against the longitudinal side plates 43 of compensating levers 44 which side plates are apertured at their larger ends to fit around the inner ends of the cross shafts 19. These apertured larger ends of the side plates 43 abut against and can be welded to abutment rings 45 which are in turn welded to the cross shafts 19.

The upper half bearing housing 40 for the inner end of each front cross shaft 19 is secured to the corresponding front cross bolster as follows:

The numeral 48 represents a U-shaped metal spacer block above each forward bearing 38 and the upstanding legs 49 of which are welded to the undersides of the front cross bolster 32 as best shown in FIGS. 2, 3, 4 and 7. The horizontal bottom plate 50 of each spacer block 48 has a front depending lip 51 and a rear depending lip 52, these depending lips extending transversely of the line of vehicle travel. Each of these depending lips 51, 52 carries an adjusting screw 53 extending through a threaded hole therein, these adjusting screws extending lengthwise of the line of vehicle travel. Each screw carries a pair of lock nuts to hold it in any adjusted position. These adjusting screws 53 abut against opposite sides of a structure comprising a horizontal plate 54 (FIG. 4) and vertical side plates 55 connected, as by welding, to one another and to the top half bearing housing 40 of the companion front bearing 38. These vertical plates 55 extend lengthwise of the cross shafts 19 and the adjusting screws abut against these plates. The top plate 54 is secured by bolts 56 to the underside of the horizontal plate 50 of the companion spacer block 48. The holes for these bolts 56 are oversize to permit bolting each plate 54 to its spacer block 48 in any position of adjustment determined by the setting of the adjusting screws 53.

The upper half bearing 40 for the inner end of each rear cross shaft 19 is secured to the rear bolster 32 of the frame 10 (FIGS. 2, 3, 4 and 6) as follows:

The numeral 60 represents a rectangular horizontal plate welded to the underside of the rear bolster 32 above each of the bearings 38 for the rear hub structures or cross shafts 19. To each plate 60 is secured, as by corner bolts 61 and spacer blocks 62, a rectangular slide plate 63, this being provided with an upstanding central rib 64 which is drawn against the underside of the bolster 32 by central bolts 65. Each slide plate 63 slides fore-and-aft of the line of vehicle travel on a guide plate 66 secured by bolts 68 to a plate 69 welded, through vertical plates 70, to the top half bearing housing 40 of the corresponding bearing 38. Upstanding side flanges 71 are provided, on each side of each guide plate 66, these upstanding flanges extending lengthwise of the line of vehicle travel and each being provided with a top horizontal flange 72 projecting over the top of the corresponding side of each slide plate 63. These top flanges are accomodated in the spaces provided by the central rib 64 and corner spacer blocks 62 and sligingly embrace the slide plates 63.

The compensating levers 44 have been referred to as each having a pair of vertical side plates 43 apertured to embrace and being welded to the inner end of its hub structure or cross shaft 19. Each of these compensating levers is completed by flanges 73, 74 projecting toward one another from the longitudinal edges of each side plate 43, a generally upright cross plate 75 connecting the fulcrum ends of the side plates 43, and cross rods 76 and generally horizontal plates 78 connecting those ends of each pair of side plates 43 which are remote from their cross shaft 19. With reference to the line of vehicle travel, the forward compensating lever 44 trails and has its rear end arranged below the forward end of its companion compensating lever 44 for the corresponding rear wheel 15. Also the rear extremity of each of these forward compensating levers 44 has a welded upright plate 77 the upwardly projecting edge 79 of which can engage the underside of its rearward compensating lever 44 in event of breakdown of its compression rubber spring body 80, hereinafter described. Also each forward compensating lever 44 can have a curved spring leaf 81, the lower end of which can be bolted to a cross plate 82 near the center of the forward compensating lever 44 and the upper end of which is arranged above the cross rod 76 of the rearward compensating lever 44, as best shown in FIG. 4. The purpose of these spring leaves 81 is to resist rebound forces in the the event of failure of the compression rubber spring body, hereinafter described.

In the two tandem wheel suspension shown in FIGS. 1 – 7, it is an important feature of the invention that, with reference to the line of vehicle travel, all of the wheel arms 18 trail or project rearwardly from their hub structures or cross shafts 19; each forward compensating lever 44 also trails or projects rearwardly from its front hub structure or cross shaft 19; but that the rearward compensating lever 44 projects forwardly from its rear hub structure or cross shaft 19 to a position above the rear end of the companion forward compensating lever 44.

By this arrangement a simple compression rubber spring body 80 can be interposed between the opposing superposed ends of each pair of compensating levers 44 to provide substantially the entire resilient support for the vehicle frame 10 on its tandem wheels 15.

This flexible rubber body 80 is shown as being of generally cylindrical or barrel-like form with tapered ends of diminishing cross section, and a through bore 85 extending therethrough. A circular end plate 86 can be secured, as by vulcanization, to each tapered end of the rubber body and each of these circular end plates 86 can be secured, as by screws 88, to the corresponding cross plates 78 of the pair of compensating levers 44 between which each compression rubber body 80 is interposed.

OPERATION - FIGS. 1 – 7

The direction of movement of the vehicle is shown by large arrows above FIGS. 1 – 3 and below FIGS. 4 and 5 and in the operation of the form of the invention shown in FIGS. 1 – 7, the upward movement of either front tandem wheel 15 and its stub axle 16 effects a corresponding upward movement of its wheel arm 18 and counterclockwise movement (as viewed in FIGS. 1, 2, 4 and 5) of the hub structure or tubular cross shaft forming the hub of this wheel arm 18, such movement being permitted by the rubber bushings 21 and 39 of the frame bearings 20 and 38 for this front wheel hub structure 19. This angular counterclockwise movement of the hub structure or tubular cross shaft of the front tandem wheel 15 is transmitted directly to the companion compensating lever 44 fixed to project rearwardly from this front cross shaft 19 so as to cause an upward movement of the rear end of this front tandem wheel compensating lever 44.

Conversely, the upward movement of either rear tandem wheel 15 and its stub axle 16 effects a corresponding counterclockwise movement (as viewed in FIGS. 1, 2, 4 and 5) of the hub structure or tubular cross shaft 19 forming the hub of this wheel arm 18, such movement being permitted by the rubber bushings 21 and 39 of the frame bearings 20 and 38 for this rear tandem wheel hub structure 19. This angular counterclockwise movement of the tubular cross shaft 19 for this rear tandem wheel 15 is transmitted directly to the corresponding compensating lever 44 fixed to project forwardly from this cross shaft so as to cause a downward movement of the front end of this rear tandem wheel compensating lever 44.

It is a feature of the present invention that the rear end of the front tandem wheel compensating lever 44 and the front end of the rear tandem wheel compensating lever 44 are arranged one above the other and also move toward each other in response to such upward movement of either tandem wheel (or downward movement of the body 10 under increasing load thereon). Its also desirable that each front tandem wheel compensating lever 44 be arranged below and be moved upwardly by the upward movement of its front tandem wheel 15.

Thus, with such movement of the superposed ends of the compensating levers 44 toward each other (the bottom one up and the top one down), a simple compression rubber spring body 80 can be interposed between each pair of these superposed ends to provide substantially the entire resilient support for the frame 10 on the wheels 15. This rubber body 80 can be of the generally cylindrical hollow core barrel shape shown and expands and contracts transversely of its hollow core to accomodate changes in load as well as in road conditions.

Desirably screws 88 connect the opposite ends of each rubber body 80 to the superposed ends of its pair of compensating levers 44 and also the spring leaf 81 (FIG. 4) can limit rebound movement of the superposed ends of the compensating levers 44 away from each other.

By having the rear end of the front tandem wheel compensating lever 44 move upwardly in its working movement and the front superposed end of the rear wheel compensating lever 44 move downwardly in its working movement, it will be observed that not only will the suspension merely become springless in the event of complete breakdown or loss of the rubber spring 80, but also the compensating levers 44 will not drag along the road, much less dig into the road, in the event of such complete spring failure.

The suspension is self-steering, that is, in rounding a curve the stub axles 16 of the rear tandem wheels 15 will assume such angles in a horizontal plane with reference to the fixed stub axles 16 of the front tandem wheels 15 as will enable all of the wheels to round the curve without tire scuffing. This self-steering is effected by the flat surfaced sliding bearing plates 63 and 66 interposed between the inner bearings 38 for the rear tandem wheels 15 and the frame 10 so as to permit limited fore-and-aft movement of the inner ends of the rear cross shafts 19. Thus, referring to FIG. 3, in rounding a curve, say, to the right, the rear pair of tandem wheels 15 will be drawn to the right (with reference to the frame 10), by the swinging of the rear end of the frame 10 to the left, through their frictional engagement with the roadway, in order to avoid tire scuffing in rounding the curve. If this force against the tires were resisted, tire scuffing would take place, but such movement to the right of the rear tandem wheels 15 is permitted, the rear tandem wheel stub shafts 16, cross shafts 19 and bearings 38 swinging counterclockwise, as viewed in FIG. 3, about vertical axes intersecting the frame bearings 20 to permit the rear tandem wheels 15 to track properly around the curve without tire scuff. This movement is permitted by the sliding engagement of the horizontal plates 63, 66, the relative movement of which permits the required forward movement of the inner end of the left hand rear cross shaft 19 and the required rearward movement of the inner end of the right hand rear cross shaft 19 for this purpose. On returning to a straightaway, the rear pair of rubber tired tandem wheels, again to avoid tire scuff, return to their normal relation shown.

THREE TANDEM WHEEL SUSPENSION - FIGS. 8 AND 9

With the exception of an added short double-ended compensating lever or walking beam 90 and longer compensating levers 44 (distinguished in FIGS. 8 and 9 by the suffix $a$), the parts used to provide the two wheel tandem suspension of FIGS. 1 – 7 are used in the three wheel tandem suspension of FIGS. 8 and 9 and hence the same reference numerals have been used and a description of their construction and mounting will not be repeated.

This short double-ended compensating lever 90 is in the form of a walking beam the forward end lever of which is indicated at 91 and the rear end lever of which is indicated at 92. Each end lever 91, 92 of this walking beam 90 can be of the same construction as each compensating lever 44 (FIGS. 1 – 7) and is shown as similarly fixed to a hub structure or tubular cross shaft 19 journalled to the frame 10 by means of outer and inner bearings similar to the frame bearings 20 and 38, including the adjusting mechanism 48 – 58 for each bearing 38 illustrated at the left of FIGS. 4 and 7. However each end 91, 92 of the double-ended lever or walking beam 90 is materially shorter, in fact half the effective length, of the compensating levers 44a for the front and rear wheels 15, respectively, in order to balance or proportion the load among the three tandem wheels at each side of the vehicle.

The rear end lever 92 of each walking beam 90 is connected by screws 88 to the bottom of a barrel-shaped compression rubber spring body 80, the upper end of which is similarly secured to the forward end of the compensating lever 44a of the rearmost tandem wheel 15. The forward end lever 91 of this walking beam 90 is connected by screws 88 to the top of another barrel-shaped cylindrical compression rubber spring body 80, the lower end of which is similarly secured to the rear end of the compensating lever 44a for the foremost tandem wheel 15.

For self-steering, the inner frame bearings 38 for the cross shafts 19 of both the forward and rearward tandem wheels 15 are secured to the frame by horizontal slide plates 63, 66 in the same manner as shown at the right of FIG. 4 and at the center of FIG. 6.

OPERATION - FIGS. 8 AND 9

The upward movement of, say, the foremost wheel 15 at one side of the vehicle effects upward movement of its stub axle 16 to effect corresponding angular movement of its arm 18 and tubular cross shaft 19, such movement being permitted by the rubber bushings 21 and 39 of the frame bearings 20 and 38, respectively. This rotation of the foremost tubular cross shaft 19 at one side of the vehicle is transmitted directly to the compensating lever 44a fixed thereto to raise the rear end of this compensating lever 44a. This compresses upwardly the barrel-shaped cylindrical compression rubber body 80 both to expand this rubber body horizontally and also to lift the forward end lever 91 of the walking beam 90.

This walking beam 90 is fixed to its central tubular cross shaft 19, in turn journalled inits frame bearings 20, 38, the latter being preferably adjustable lengthwise of the frame by screws 53 in the same manner as with the front cross shaft 19 in the form of the invention shown in FIGS. 1 – 7.

The upward movement of the forward end 91 of either double-ended lever or walking beam 90 is transmitted through its tubular cross shaft 19 to depress the arms 18 and stub axle 16 of the central tandem wheel 15 thereby to cause this central tandem wheel to share the load imposed on its foremost tandem wheel, It will be noted, however, that the foremost compensating arm 44a is twice the length of each end 91 and 92 of the double-ended compensating lever or walking beam 90.

Similarly the upward movement of either rear wheel 15 of the three wheel tandem shown in FIGS. 8 and 9 raises the rear end of its arm 18 and rotates its cross shaft 19 in its rubber bushed frame bearings 20 and 38. This rear cross shaft rotation is transmitted directly to its compensating lever 44a to compress downwardly the rear barrel-shaped rubber body 80 mounted on the rear end 92 of the walking beam 90.

This effects downward movement of the rear end 92 of the walking beam 90, rotating its frame bearinged shaft 19 and arm 18 to increase pressure on the central wheel 15, thereby to cause this central tandem wheel 15 to share the assumed load imposed on the rear tandem wheel 15. Again it will be noted that this rear end 92 of the walking beam 90 is half the length of the companion compensating lever 44a for the rearmost wheel 15.

Upward movement of the central tandem wheel 15, through its arm 18, effects counterclockwise movement of its cross shaft 19 and walking beam 90 in its frame bearings 20 and 38. This movement is transmitted upwardly by the short walking beam rear arm 92 to the longer compensating lever 44a for the rearmost wheel 15. The resilient resistance to such movement is, of course, provided by the barrel-shaped rear compression rubber body 80. This walking beam movement is transmitted downwardly by its front short end 91 to the longer compensating lever 44a for the foremost wheel 15. The resilient resistance to such movement is provided by the front compression rubber body 80 and these compression rubber bodies serve to transmit such upward movement of the central tandem wheel as downward pressure against the front and rear wheels to balance the load among them.

By "rubber" as used in the accompanying claims is meant natural rubber, synthetic rubber or a mixture thereof, and by "wheel" is meant the ground engaging means 15 whether in the form of a single wheel or the dual wheels shown.

I claim:

1. A vehicle spring suspension adapted to be interposed between a vehicle frame and a pair of tandem rubber tired wheels arranged one in advance of the other at at least one side of the frame and the suspension having a generally horizontal hub structure associated with each wheel and journalled on said frame to extend transversely of the line of vehicle travel, an arm fixed at one end to each hub structure and projecting radially therefrom, a stub axle fixed to each arm remote from its hub structure and forming a journal for the corresponding wheel and a compensating lever fixed at one end to each hub structure and projecting radially therefrom with the other end of one of said compensating levers being arranged above the other end of the other of said compensating levers; wherein the improvement comprises said arms and compensating levers being so arranged that the said other ends of said compensating levers move toward each other in response to increasing load on said frame, a resilient compression rubber body interposed between the other ends of said compensating levers and expanding and contracting transversely of the line of force applied thereto by said compensating levers to provide resilient support for said frame on said pair of tandem wheels, a first fastening means securing one end of said resilient compression rubber body to said other end of one of said compensating levers, and a second fastening means securing the other end of said resilient compression rubber body to said other end of the other of said compensating levers, whereby said resilient compression rubber body also serves as a tension shackle connecting together said other ends of said compensating levers to restrain movement thereof away from each other.

2. A vehicle spring suspension as set forth in claim 1 wherein each arm of each wheel trails from its hub structure with reference to the line of vehicle travel, said compensating lever of the front tandem wheel trails from its hub structure, with reference to the line of vehicle travel, and said compensating lever of the rear tandem wheel projects forwardly from its hub structure, with reference to the line of vehicle travel, to a position above the opposing end of the compensating lever of said front tandem wheel.

3. A vehicle spring suspension adapted to be interposed between a vehicle frame and a pair of tandem rubber tired wheels arranged one in advance of the other at at least one side of the frame and the suspension having a generally horizontal hub structure associated with each wheel and journalled on said frame to extend transversely of the line of vehicle travel, an arm fixed at one end to each hub structure and projecting radially therefrom, a stub axle fixed to each arm remote from its hub structure and forming a journal for the corresponding wheel and a compensating lever fixed at one end to each hub structure and projecting radially therefrom with the other end of one of said compensating levers being arranged above the other end of the other of said compensating levers; wherein the improvement comprises said one of said compensating levers being of sufficient length to contact the ground if it were unrestrained and said arms and compensating levers being so arranged that the said other ends of said compensating levers move toward each other in response to increasing load on said frame thereby to eliminate the danger of said one of said compensating levers so contacting and digging into the ground, and spring means interposed between said other ends of said compensating levers and providing resilient support for said frame on said pair of tandem wheels.

* * * * *